United States Patent
Yu et al.

(10) Patent No.: US 10,802,542 B2
(45) Date of Patent: *Oct. 13, 2020

(54) INTERACTION METHOD, INTERACTION APPARATUS, AND USER EQUIPMENT

(71) Applicant: BEIJING ZHIGU RUI TUO TECH CO., LTD., Beijing (CN)

(72) Inventors: Kuifei Yu, Beijing (CN); Ran Xu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 82 days.

This patent is subject to a terminal disclaimer.

(21) Appl. No.: 15/414,750

(22) Filed: Jan. 25, 2017

(65) Prior Publication Data

US 2017/0227990 A1 Aug. 10, 2017

(30) Foreign Application Priority Data

Feb. 4, 2016 (CN) .......................... 2016 1 0080569

(51) Int. Cl.
*G06F 1/16* (2006.01)
*G06F 3/0481* (2013.01)
(Continued)

(52) U.S. Cl.
CPC .......... *G06F 1/1652* (2013.01); *G06F 1/1626* (2013.01); *G06F 3/03* (2013.01);
(Continued)

(58) Field of Classification Search
None
See application file for complete search history.

(56) References Cited

U.S. PATENT DOCUMENTS

2010/0064244 A1* 3/2010 Kilpatrick, II ........ G06F 1/1616
715/773
2010/0117975 A1 5/2010 Cho
(Continued)

FOREIGN PATENT DOCUMENTS

CN 101739171 A 6/2010
CN 102857592 A 2/2013
(Continued)

*Primary Examiner* — Matthew Yeung
(74) *Attorney, Agent, or Firm* — Sheppard Mullin Richter & Hampton LLP

(57) ABSTRACT

Embodiments of the present application disclose an interaction method, an interaction apparatus, and user equipment. The method comprises: determining shape related information of a deformable display surface, where the shape related information corresponds to a first shape of the deformable display surface after a folding deformation; determining multiple effective interaction areas on the deformable display surface at least according to the shape related information, where the multiple effective interaction areas meet the following conditions: in nonadjacent positions on the deformable display surface, and adjacent in a spatial position in the first shape; and using the multiple effective interaction areas as one interaction area at least according to a first relative position of the multiple effective interaction areas in the spatial position in the first shape to provide a display output interface to at least one interaction object. The technical solutions in the embodiments of the present application can bring new experience to a user according to a deformation property of a deformable device.

32 Claims, 15 Drawing Sheets

(51) Int. Cl.
*G06F 3/03* (2006.01)
*G09G 5/38* (2006.01)

(52) U.S. Cl.
CPC ............ *G06F 3/0481* (2013.01); *G09G 5/38* (2013.01); *G06F 1/1694* (2013.01); *G06F 2203/04803* (2013.01); *G09G 2310/0221* (2013.01); *G09G 2354/00* (2013.01); *G09G 2380/02* (2013.01)

(56) References Cited

U.S. PATENT DOCUMENTS

| | | | |
|---|---|---|---|
| 2012/0038570 A1* | 2/2012 | Delaporte | G06F 1/1616 345/173 |
| 2012/0306910 A1 | 12/2012 | Kim et al. | |
| 2015/0301636 A1* | 10/2015 | Akimoto | G06F 3/044 345/173 |
| 2016/0026219 A1 | 1/2016 | Kim et al. | |
| 2016/0246559 A1* | 8/2016 | Jung | G06F 3/1431 |
| 2016/0299539 A1* | 10/2016 | Jang | G06F 1/1681 |
| 2017/0075389 A1 | 3/2017 | Yeom | |

FOREIGN PATENT DOCUMENTS

| | | |
|---|---|---|
| CN | 105159405 A | 12/2015 |
| CN | 105302238 A | 2/2016 |

\* cited by examiner

INTERACTION METHOD, INTERACTION APPARATUS, AND USER EQUIPMENT

CROSS REFERENCE TO RELATED APPLICATION

The present application is based on and claims the benefit of priority to Chinese Application No. 201610080569.2, filed on Feb. 4, 2016, the entire contents of which are incorporated herein by reference.

TECHNICAL FIELD

The present application relates to the field of interaction technologies, and in particular, to an interaction method, an interaction apparatus, and user equipment.

BACKGROUND

With the development of technologies, deformable devices such as flexible devices become increasingly popular. Deformable devices have changeable shapes, and therefore bring users a lot of new user experience. For example, demands of users for wearable devices to meet different body curves, demands for devices to have increased sizes for using and decreased sizes for carrying, and the like are met more easily. When deformable interaction devices are used to perform interaction, different experience is also brought to users.

SUMMARY

A possible objective of embodiments of the present application is to provide an interaction solution based on a deformable display surface.

According to a first aspect, a possible implementation solution of the present application provides an interaction method, comprising:

determining shape related information of a deformable display surface, where the shape related information corresponds to a first shape of the deformable display surface after a folding deformation;

determining multiple effective interaction areas on the deformable display surface at least according to the shape related information, where the multiple effective interaction areas meet the following conditions: in nonadjacent positions on the deformable display surface, and adjacent in a spatial position in the first shape; and using the multiple effective interaction areas as one interaction area at least according to a first relative position of the multiple effective interaction areas in the spatial position in the first shape to provide a display output interface to at least one interaction object.

According to a second aspect, a possible implementation solution of the present application provides an interaction apparatus, comprising:

an information determining module, configured to determine shape related information of a deformable display surface, where the deformable display surface is at least configured to perform information output, and the shape related information corresponds to a first shape of the deformable display surface after a folding deformation;

an area determining module, configured to determine multiple effective interaction areas on the deformable display surface at least according to the shape related information, where the multiple effective interaction areas meet the following conditions: in nonadjacent positions on the deformable display surface, and adjacent in a spatial position in the first shape; and a display output interface providing module, configured to use the multiple effective interaction areas as one interaction area at least according to a first relative position of the multiple effective interaction areas in the spatial position in the first shape to provide a display output interface to at least one interaction object.

According to a third aspect, a possible implementation solution of the present application provides user equipment, where the user equipment comprises:

a memory, configured to store a program; and a processor, configured to execute the program stored in the memory, the program causes the processor to execute the following operations:

determining shape related information of a deformable display surface, where the shape related information corresponds to a first shape of the deformable display surface after a folding deformation;

determining multiple effective interaction areas on the deformable display surface at least according to the shape related information, where the multiple effective interaction areas meet the following conditions: in nonadjacent positions on the deformable display surface, and adjacent in a spatial position in the first shape; and using the multiple effective interaction areas as one interaction area at least according to a first relative position of the multiple effective interaction areas in the spatial position in the first shape to provide a display output interface to at least one interaction object.

In at least one implementation solution of the embodiments of the present application, after a deformation of a deformable display surface occurs, multiple effective interaction areas adjacent in the spatial position are recombined to form one new interaction area used to provide a display output interface to an interaction object, thereby bringing new experience to a user by using a deformation property of a deformable device.

DETAILED DESCRIPTION

Figure 1:
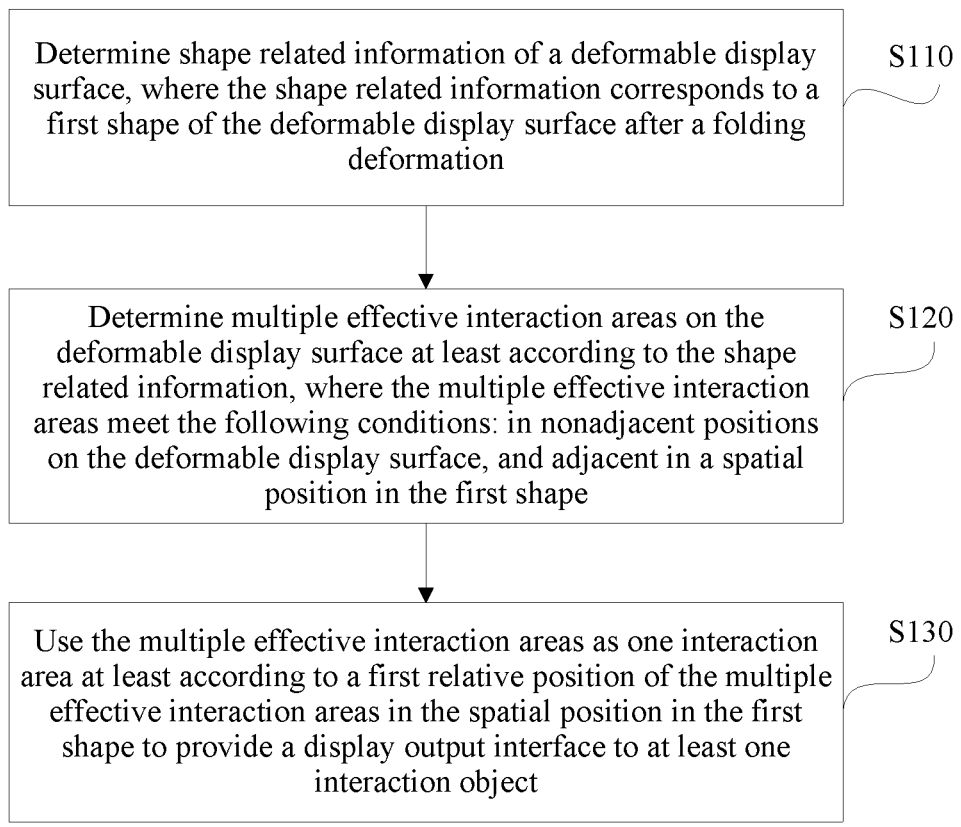
FIG. 1 is a flowchart of an interaction method according to an embodiment of the present application.

The specific implementing manners of the present application are further described below in detail with reference to the accompanying drawings (a same reference numeral in several drawings represents a same element) and embodiments. The embodiments below are used for describing the present application rather than to limit the scope of the present application.

A person skilled in the art may understand that, terms such as "first" and "second" in the present application are only used to distinguish different steps, devices or modules and the like, but do not represent any specific technical meanings, and do not denote a necessary logic order among the steps, devices or modules and the like.

The inventor of the present application finds that, because a deformable display surface has a changeable shape, after a deformation occurs, for some effective interaction areas before the deformation, for example, areas that are covered or blocked after the deformation occurs, effective interaction may no longer be able to be performed after the deformation occurs. Meanwhile, some multiple interaction areas that are originally scattered may become multiple effective interaction areas adjacent in a spatial position after the deformation occurs, and effective use of the multiple effective interaction areas may cause a deformable device to bring more desirable user experience to a user.

In the following description of the present application:

An interaction object of the deformable display surface may be a user, or may be an electronic device and the like.

An effective interaction area is an area where effective interaction may be performed with an interaction object. In a possible implementing manner, the effective interaction area may be an area with which an interaction object may perform interaction. For example, the effective interaction area may be an area where an interaction object sees or acquires an image. In some possible implementing manners, for example, it may be set that there is no obstacle within a set distance range on a side faced by the effective interaction area; and/or the effective interaction area faces a side where the interaction object is located, and the like. Alternatively, further, in another possible implementing manner, in addition to that an interaction object may perform interaction, it is further required that the interaction meets a set interaction condition, to cause interaction between the effective interaction area and the interaction object to achieve an expected interaction effect. For example, the interaction condition may comprise that: a deviation between the first interaction information before being output by using the effective interaction area and the second interaction information that is output and can be acquired by the interaction object is within a set deviation range.

A position of an interaction area on the deformable display surface is: a position of a coordinate area corresponding to the area on a coordinate surface, where the deformable display surface is used as the coordinate surface. Regardless of how the deformable display surface is curved or folded, a coordinate area corresponding to the area does not change.

A spatial position of an area is a position of the area in a spatial coordinate system.

As shown in FIG. 1, an embodiment of the present application provides an interaction method, comprising:

S110: Determine shape related information of a deformable display surface, where the shape related information corresponds to a first shape of the deformable display surface after a folding deformation.

S120: Determine multiple effective interaction areas on the deformable display surface at least according to the shape related information, where the multiple effective interaction areas meet the following conditions: in nonadjacent positions on the deformable display surface, and adjacent in a spatial position in the first shape.

S130: Use the multiple effective interaction areas as one interaction area at least according to a first relative position of the multiple effective interaction areas in the spatial position in the first shape to provide a display output interface to at least one interaction object.

For example, the interaction apparatus provided in the present application is used as an execution subject in this embodiment to execute S110 to S130. Specifically, the interaction apparatus may be disposed in user equipment in a manner of software, hardware or a combination of software and hardware, or, the interaction apparatus may be the user equipment. The user equipment comprises but not limited to a mobile phone, a computer, a television, a wearable device or the like that has a deformable display surface that allows a folding deformation.

In an implementing manner in this embodiment of the present application, after a deformation of a deformable display surface occurs, multiple effective interaction areas adjacent in the spatial position are recombined to form one new interaction area used to provide a display output interface to an interaction object, thereby bringing new experience to a user by using a deformation property of a deformable device.

The method in this embodiment of the present application is further described by using the following implementing manners.

Figure 2A:
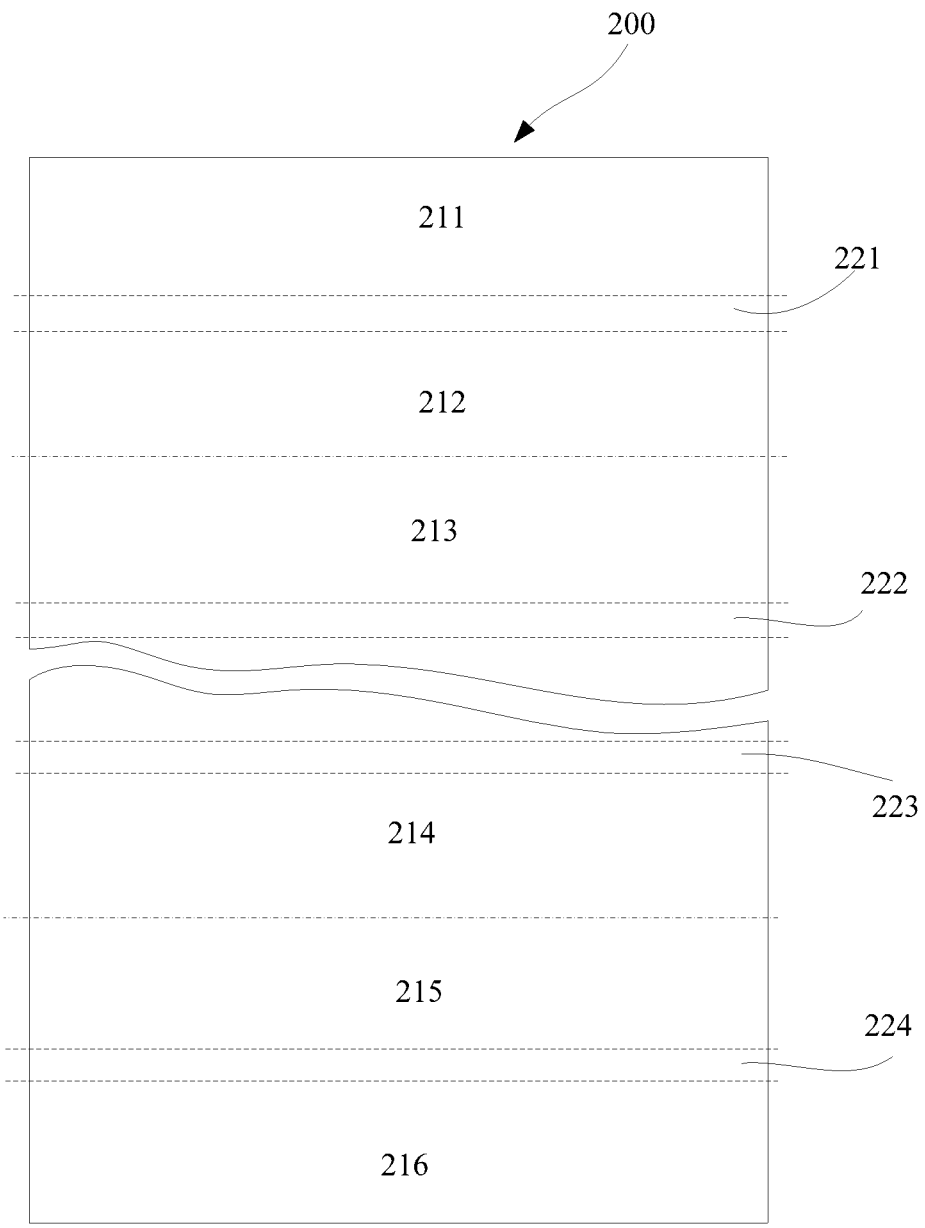
FIG. 2a to FIG. 2e are schematic diagrams of an application scenario of an interaction method according to an embodiment of the present application.
Figure 2B:
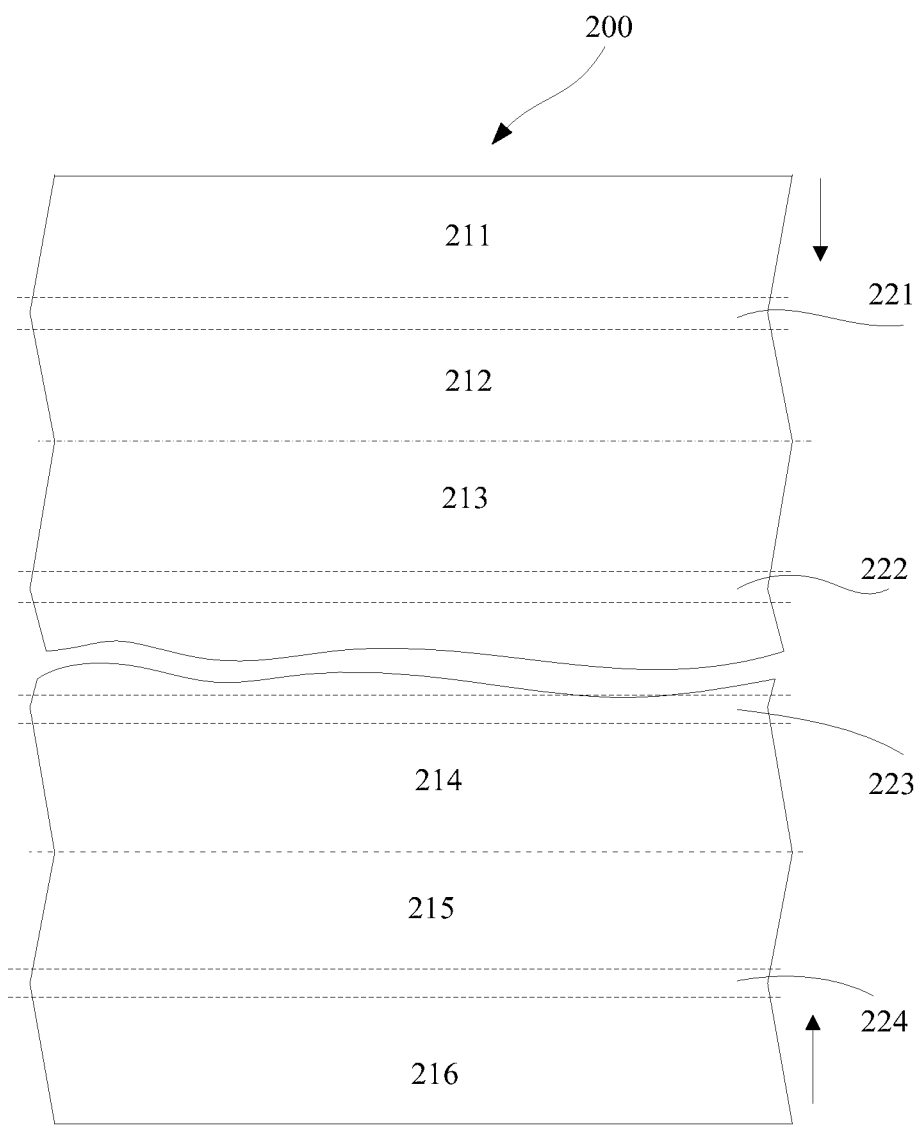

In a possible implementing manner, a shape of a deformable display surface 200 being unfolded is a rectangle shown in FIG. 2a. During a folding deformation, the rectangle shown in FIG. 2a turns into a wavy state shown in FIG. 2b and eventually becomes a folded state shown in FIG. 2c. FIG. 2d is a right diagram of FIG. 2c.

As can be seen from FIG. 2a to FIG. 2d, after a folding deformation of a deformable display surface 200 occurs, a part of the interaction area (for example, wing-surface areas 212 to 215) is folded and blocked and is no longer an effective interaction area. In some possible implementing manners, another part of interaction area (for example, wing-surface areas 211 and 216) may also be no longer an effective interaction area because of a facing-direction problem (for example, an interaction direction D of an interaction object to the deformable display surface 200 is a direction right opposite the deformable display surface 200 shown in FIG. 2a to FIG. 2c).

In the implementing manner shown in FIG. 2a to FIG. 2d, only several remaining folding areas 221 to 225 where several outwardly-bending end surfaces are located are effective interaction areas that still can be used to perform effective interaction with an interaction object.

In this embodiment of the present application, a folding area is an area corresponding to a bending end that connects two opposite wing surfaces in a creased structure. For example, a folding area 221 is an area corresponding to a bending end that connects two opposite wing surface areas 211 and 212 after folding.

Conventionally, after the foregoing folding deformation is performed on the deformable display surface 200, for remaining effective interaction areas, a possible manner is: an interaction function of the entire deformable display surface 200 is turned off, and interaction is no longer performed with the interaction object. For example, a display surface is turned off, and a user no longer sees displayed content. Another possible manner is: The remaining effective interaction areas are still used as a part of the display output interface before the deformation to perform incomplete interaction with the interaction object. For example, each effective interaction area displays an image area before the deformation.

The inventor of the present application finds that, in some scenarios, after the folding deformation of the deformable display surface occurs, multiple effective interaction areas adjacent in a spatial position may be formed. Although an area of one effective interaction area may be relatively small and can hardly be used as a separate display output interface to perform interaction with an interaction object, the multiple effective interaction areas may be recombined into one relatively large interaction area and may be reused.

In this embodiment of the present application, shape related information corresponding to the first shape of the deformable display surface after a folding deformation is determined, and the multiple effective interaction areas are then determined according to the shape related information.

In a possible implementing manner, optionally, the shape related information may comprise:

the first shape information of the first shape.

Figure 2C:
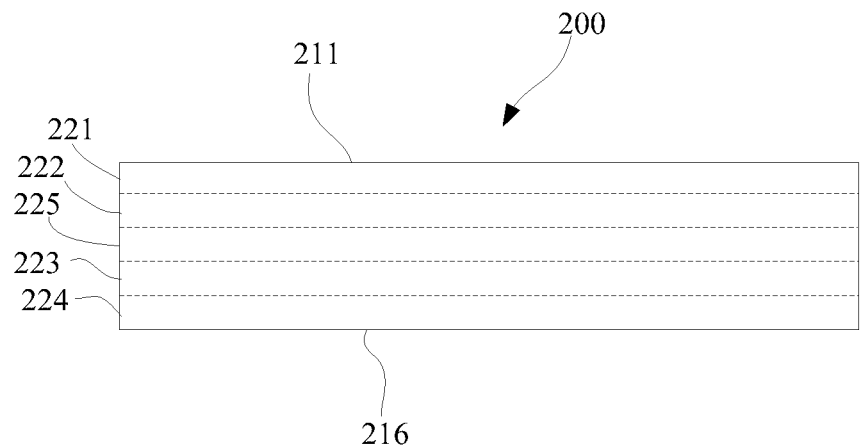
Figure 2D:
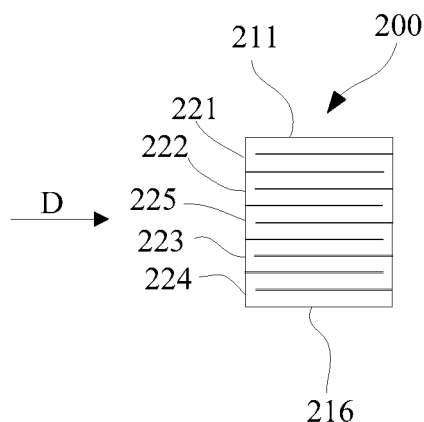

For example, in the implementing manner shown in FIG. 2a to FIG. 2d, shape information of the deformable display surface after the folding shown in FIG. 2c and FIG. 2d may be acquired as the shape related information.

In another possible implementing manner, optionally, the shape related information may also be not the first shape information, and instead may indirectly obtain other information of the first shape information. For example, the shape related information may comprise:

second shape information of a second shape of the deformable display surface before the folding deformation, and deformation information corresponding to the folding deformation.

Here, the deformation information may be a shape change parameter, or may be another parameter related to a deformation. For example, when the deformable display surface is a thermally-induced deformation material, the deformation information may comprise temperature change information and the like of areas. Alternatively, for example, the deformation information may further be displacement information, of areas on the deformable display surface, acquired by using an acceleration sensing array, a gyroscope array, and the like corresponding to the deformable display surface.

A person skilled in the art may know that the first shape may also be determined according to the second shape information and the deformation information.

In a possible implementing manner, a deformation of the deformable display surface is controllable, and is configured to perform different deformations according to different deformation control instructions. The deformation control instruction may be generated in response to an interaction object interaction operation. In a possible implementing manner, according to a beforehand setting, each deformation control instruction may correspond to shape information after a deformation; or may correspond to a piece of deformation information. Therefore, in S110, the shape related information may be determined at least according to a deformation control instruction, where the deformation control instruction is used to control the folding deformation of the deformable display surface.

For example, in the implementing manner as shown in FIG. 2a to FIG. 2d, a first deformation control instruction may be obtained in response to an operation that a user clicks a "Fold" button. The first deformation control instruction corresponds to the shape shown in FIG. 2c. In this case, regardless of a shape of the deformable display surface before a folding deformation, once the first deformation control instruction is acquired, the deformable display surface is automatically controlled to deform into the shape shown in FIG. 2c.

In other possible implementing manners, for example, when the deformation control instruction corresponds to deformation information, in S110, the second shape information further requires to be acquired to obtain the shape related information.

In addition to the foregoing the deformation control instruction, a deformation sensor configured to acquire corresponding deformation sensing information according to a deformation of the deformable display surface may be further used to obtain the deformation related information. The deformation sensor, for example, may generate a corresponding voltage or current parameter value according to a deformation of the deformable display surface, where the deformation sensing information is the voltage or current parameter value.

In a possible implementing manner, after the folding deformation of the deformable display surface occurs, the shape related information may be determined at least according to the deformation sensing information.

In the method in this embodiment of the present application, after the shape related information is acquired, the multiple effective interaction areas may be determined at least according to the shape related information.

In this embodiment of the present application, the multiple effective interaction areas meet the following conditions: in nonadjacent positions on the deformable display surface, and adjacent in a spatial position in the first shape.

Here, the multiple effective interaction areas are adjacent in a spatial position in the first shape, and therefore can be recombined into one interaction area.

In this embodiment of the present application, if two effective interaction areas are in adjacent positions on the deformable display surface and are adjacent in the spatial position in the first shape, the two effective interaction areas may be seen as one effective interaction area.

In a possible implementing manner, that the multiple effective interaction areas are adjacent in the spatial position comprises:

for a first effective interaction area of the multiple effective interaction areas, at least another effective interaction area that is adjacent in the spatial position to the first effective interaction area exists, where the first effective interaction area is any effective interaction area of the multiple effective interaction areas.

In a possible implementing manner, that two effective interaction areas are adjacent in a spatial position may be that a distance between nearby edges of the two effective interaction areas is approximately 0. For example, in the implementing manner shown in FIG. 2c and FIG. 2d, two adjacent effective interaction areas adjoin.

Figure 2E:
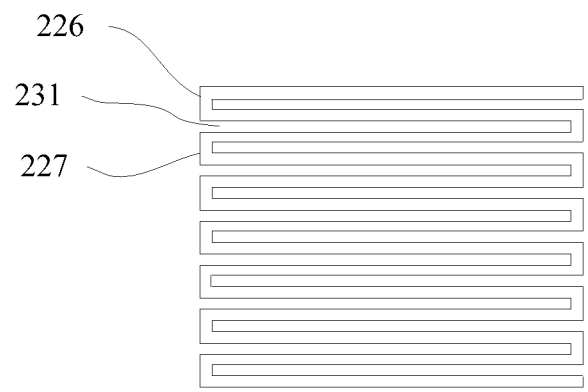

Alternatively, in another possible implementing manner, that two effective interaction areas are adjacent in a spatial position may be that a distance between nearby edges of the two interaction areas is less than a set value. For example, the deformable display surface shown in FIG. 2a may also be folded and deformed into the shape shown in FIG. 2e. A gap area 231 further exists between the two adjacent effective interaction areas 226, 227. In this implementing manner, when a width (a width in a vertical direction in FIG. 2e) of the gap area 231 is less than set value, it may be considered that the two effective interaction areas 226, 227 are adjacent.

In some possible implementing manners, the set value may be determined according to influence of the distance on interaction of the interaction object. For example, when the distance between two adjacent effective interaction areas is too large for a user to view content displayed by the two effective interaction areas as a whole, the distance between the two effective interaction areas is greater than the set value.

In a possible implementing manner, in addition to the shape related information, other information may further need to be combined to obtain the multiple effective interaction areas.

For example, in a possible implementing manner, because interaction between the deformable display surface and the interaction object is directional, in this case, to make use of a user more convenient, the multiple effective interaction areas may be determined according to the shape related information and a second relative position of the interaction object relative to the deformable display surface in the first shape. Further description is recorded in the following implementing manner.

For example, in a possible implementing manner, S120 may comprise:

determining, according to the shape related information, multiple folding areas where multiple outwardly-bending end surfaces are located, where the multiple outwardly-bending end surfaces are adjacent in the spatial position on the deformable display surface in the first shape; and determining the multiple effective interaction areas at least according to the multiple folding areas.

In a possible implementing manner, the multiple effective interaction areas are the multiple folding areas.

As shown in FIG. 2a and FIG. 2c, positions of each two of the multiple folding areas 221 to 225 on the deformable display surface are separated by at least another interaction area and are not adjacent to each other. In a deformed spatial position, the multiple folding areas 221 to 225 are adjacent. Therefore, in the implementing manner shown in FIG. 2a to FIG. 2d, it may be determined that the multiple folding areas 221 to 225 are the multiple effective interaction areas.

In some possible implementing manners, in addition to the foregoing the multiple folding areas, the multiple effective interaction areas may further comprise another area that is adjacent to or is connected to the multiple folding areas in the spatial position after the folding deformation occurs.

For example, in a possible implementing manner, as shown in FIG. 2a to FIG. 2d, the folding area 221 and the wing-surface area 211 that are connected may be used as one effective interaction area; and the folding area 224 and the wing-surface area 216 that are connected may be used as one effective interaction area.

Figure 3A:
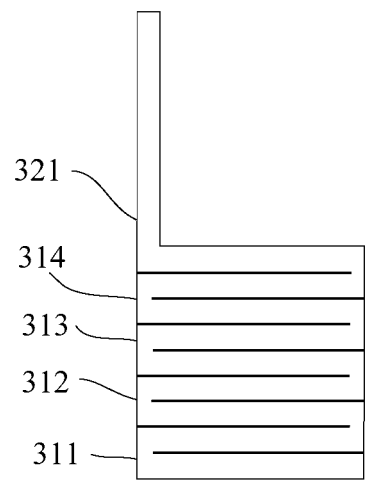
FIG. 3a and FIG. 3b are schematic diagrams of two shapes after a deformable display surface is folded in an interaction method according to an embodiment of the present application.

Further, for example, in the implementing manner shown in FIG. 3a, in a case in which an interaction direction is considered, in addition to four folding areas 311 to 314, an unfolded area 321 (an area where a wing surface is located in a creased structure) is also an effective interaction area facing the interaction object, and is adjacent to the four folding areas 311 to 314 in the spatial position. Therefore, the multiple effective interaction areas further comprise the unfolded area 321.

Therefore, the determining the multiple effective interaction areas at least according to the multiple folding areas comprises:

determining the multiple effective interaction areas at least according to the multiple folding areas and the first shape.

In some possible implementing manners, the determining the multiple effective interaction areas at least according to the multiple folding areas may comprise:

determining the multiple effective interaction areas at least according to the multiple folding areas, the first shape, and a second relative position of an interaction object relative to the deformable display surface after the folding deformation.

In some possible implementing manners, the second relative position may be real position information acquired in real time. In other possible implementing manners, the second relative position may be set by default, for example, is a common second relative position obtained according to use habits of multiple users, or is a second relative position obtained according to a setting by a user.

Figure 3B:
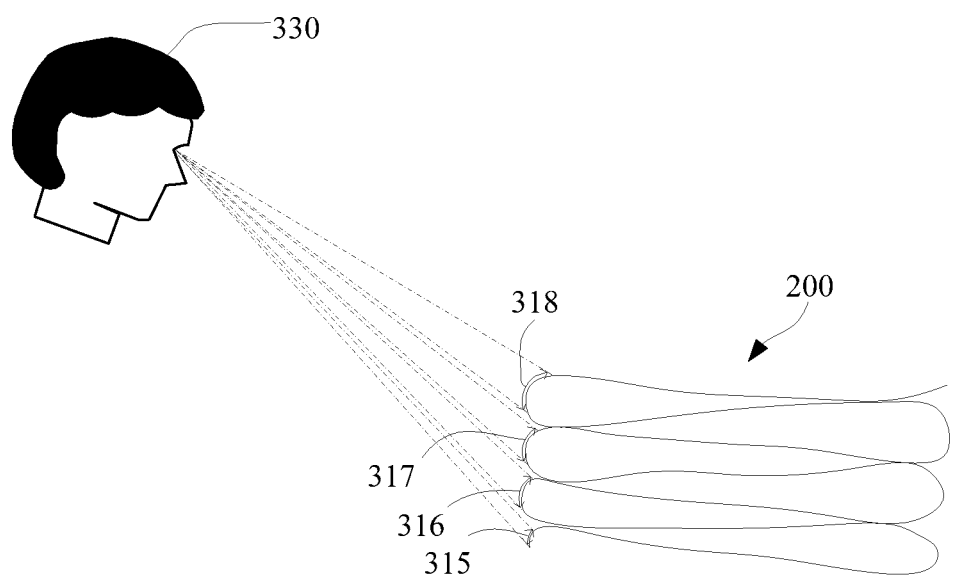

For example, in a possible implementing manner, a shape of the deformable display surface 200 shown in FIG. 2a after the folding deformation may also be a shape shown in FIG. 3b. In this implementing manner, and the interaction object is a user 330.

As can be seen in FIG. 3b, in this implementing manner, although the multiple folding areas after the folding deformation are not blocked by other areas on the deformable display surface, because the multiple folding areas are arc-shaped surfaces, in a case in which a second relative position of a user relative to the deformable display surface is unchanged, because of a viewing angle, the user may be unable to completely see all content presented on a folding area. Therefore, in this implementing manner, in consideration of use convenience for the user, optionally, the multiple effective interaction areas may be further determined by combining the first shape and the second relative position.

Therefore, in this implementing manner, multiple folding areas on a side facing the user may be first determined according to the shape related information; and multiple effective viewing areas 315 to 318 in the multiple folding areas along a sightline of the user are then determined according to the first shape and the second relative position.

In this implementing manner, the second relative position may be determined by using an interaction object position sensor on a side of the deformable display surface or by means of communication with another device on a side of the interaction object.

In this embodiment of the present application, after the multiple effective interaction areas are determined, the multiple effective interaction areas may be used as one new interaction area to provide a display output interface to an interaction object.

In a possible implementing manner, the using the multiple effective interaction areas as one interaction area at least according to a first relative position may be: splicing the multiple effective interaction areas to the interaction area according to the first relative position.

In a possible implementing manner, the deformable display surface implements interaction with an interaction object by using an interaction unit array that comprises multiple interaction units, and each effective interaction area corresponds to multiple interaction units. Here, an interaction unit may be a display pixel.

In a possible implementing manner, the splicing may be performing readdressing on addresses of interaction units in the multiple effective interaction areas, to obtain a new address that matches the interaction area.

For example, it is assumed that in the implementing manner shown in FIG. 2a, before the folding deformation, first addresses (x,y) of interaction units comprised in the folding area 221 and the folding area 222 (where x is a first row address, y is a first column address, and in a possible implementing manner, the first address may also be used as coordinates of a position of an interaction unit on the deformable display surface) are shown in Table 1 and Table 2:

TABLE 1

First addresses of 30 interaction units comprised in the folding area 221

| | | | | | | | | | |
|---|---|---|---|---|---|---|---|---|---|
| 13, 1 | 13, 2 | 13, 3 | 13, 4 | 13, 5 | 13, 6 | 13, 7 | 13, 8 | 13, 9 | 13, 10 |
| 14, 1 | 14, 2 | 14, 3 | 14, 4 | 14, 5 | 14, 6 | 14, 7 | 14, 8 | 14, 9 | 14, 10 |
| 15, 1 | 15, 2 | 15, 3 | 15, 4 | 15, 5 | 15, 6 | 15, 7 | 15, 8 | 15, 9 | 15, 10 |

TABLE 2

First addresses of 30 interaction units comprised in the folding area 222

| | | | | | | | | | |
|---|---|---|---|---|---|---|---|---|---|
| 40, 1 | 40, 2 | 40, 3 | 40, 4 | 40, 5 | 40, 6 | 40, 7 | 40, 8 | 40, 9 | 40, 10 |
| 41, 1 | 41, 2 | 41, 3 | 41, 4 | 41, 5 | 41, 6 | 41, 7 | 41, 8 | 41, 9 | 41, 10 |
| 42, 1 | 42, 2 | 42, 3 | 42, 4 | 42, 5 | 42, 6 | 42, 7 | 42, 8 | 42, 9 | 42, 10 |

In this implementing manner, if readdressing is performed on addresses of the interaction units in the two folding areas 221, 222 according to relative positions in space of the two folding areas 221, 222 in the first shape after the folding deformation shown in FIG. 2c, second addresses (x1,y1) of the interaction units as shown in Table 3 and Table 4 may be obtained:

TABLE 3

Second addresses of the 30 interaction units comprised in the folding area 221

| | | | | | | | | | |
|---|---|---|---|---|---|---|---|---|---|
| 1, 1 | 1, 2 | 1, 3 | 1, 4 | 1, 5 | 1, 6 | 1, 7 | 1, 8 | 1, 9 | 1, 10 |
| 2, 1 | 2, 2 | 2, 3 | 2, 4 | 2, 5 | 2, 6 | 2, 7 | 2, 8 | 2, 9 | 2, 10 |
| 3, 1 | 3, 2 | 3, 3 | 3, 4 | 3, 5 | 3, 6 | 3, 7 | 3, 8 | 3, 9 | 3, 10 |

TABLE 4

Second addresses of the 30 interaction units comprised in the folding area 222

| | | | | | | | | | |
|---|---|---|---|---|---|---|---|---|---|
| 4, 1 | 4, 2 | 4, 3 | 4, 4 | 4, 5 | 4, 6 | 4, 7 | 4, 8 | 4, 9 | 4, 10 |
| 5, 1 | 5, 2 | 5, 3 | 5, 4 | 5, 5 | 5, 6 | 5, 7 | 5, 8 | 5, 9 | 5, 10 |
| 6, 1 | 6, 2 | 6, 3 | 6, 4 | 6, 5 | 6, 6 | 6, 7 | 6, 8 | 6, 9 | 6, 10 |

It may be seen that, after readdressing is performed on the addresses of the interaction units in the two folding areas 221, 222, second addresses of multiple interaction units respectively comprised in the two adjacent folding areas 221, 222 after the folding deformation are also adjacent and consecutive.

In another possible implementing manner, in the splicing, readdressing may also be not performed on the addresses of the interaction units in the multiple effective interaction areas, that is, the addresses of the interaction units are kept unchanged, but correlations between the addresses are changed.

For example, in a scenario in which the interaction units are scanned during interaction with an interaction object, the first address (15,10) of the last interaction unit of the folding area 221 and the first address (40,1) of the first interaction unit of the folding area 222 are correlated, to cause that during interaction of interaction information with an interaction object, after the last interaction unit of the folding area 221 is scanned, the first interaction unit of the folding area 222 is scanned next, and another area between the two folding areas 221, 222 is no longer scanned.

In still another possible implementing manner, the splicing may also be virtual splicing, and the interaction area is a virtual interaction area, that is, according to the first relative position, the multiple effective interaction areas are virtually spliced and mapped onto the virtual interaction area.

In a possible implementing manner, after the interaction area is determined through splicing, S130 may further comprise:

determining display information matching the interaction area; and mapping the display information from the interaction area to the multiple effective interaction areas according to the first relative position.

In a possible implementing manner, display information matching the display property information is determined at least according to display property information of the interaction area.

In a possible implementing manner, the display property information may comprise:

display area shape information; for example, a size and an outer shape (for example, a rectangle and a circle) of a display area.

In this implementing manner, the display information matching the display area shape information, for example, may be that:

a size and an outer shape of display content corresponding to the display information matches a size and an outer shape of the display area.

In another possible implementing manner, the display property information may further comprise:

a distribution property of display pixels, for example, a quantity and a density distribution of the display pixels.

In this implementing manner, the display information matching the distribution property of the display pixels, for example, may be:

a quantity and a density distribution of image pixels corresponding to the display information are consistent with a quantity and a density distribution of the display pixels.

In a possible implementing manner, according to a beforehand setting, in addition to the display property information, the display information may further be related to original display information of the deformable display surface before the folding deformation. For example, in a possible implementing manner, the display information is original display information obtained through compression and simplification according to the display property information. For example, if the deformable display surface displays a piece of unstructured image or text content before the folding deformation, an intelligent cropping or digest generation algorithm is used to generate an image or text suitable for a newly formed interaction area. Alternatively, in another possible implementing manner, the display information is other information correlated to the original display information. For example, the original display information is text display content information of a book, and the display information may be description item information and/or abstract information and the like of the book and/or chapter information and position information of the foregoing text display content information.

In still another possible implementing manner, according to a beforehand setting, a folding deformation of the deformable display surface may correspond to fixed display information. For example, after the deformable display surface shown in FIG. 2a is folded and deformed into the shape shown in FIG. 2c, the shape corresponds to output of display information, for example, display of time and date of a set format. Therefore, the display information may be determined according to the folding deformation or the first shape.

A person skilled in the art may know that the manner of determining display information matching the interaction area may further be another manner, and the manners are no longer listed one by one herein.

After the display information corresponding to the interaction area is determined, in this embodiment of the present application, the display information is mapped from the interaction area to the multiple effective interaction areas according to the first relative position.

Based on an existing display system, the mapping the display information from the interaction area to the multiple effective interaction areas according to the first relative position may be implemented on four layers:

A) Implementation on an application layer: When data in a corresponding screen buffer is generated according to the first relative position and the display information by using picture browsing software or reading software, mapping is performed, so as to form, in the screen buffer, a mapped image (for example, the image shown in FIG. 4c) that can be displayed by the system.

B) Implementation on a graphic accelerator: To save a time for a CPU to fill a frame buffer, a display system usually has a part of a graphic accelerator that transforms a vector graphic into a raster graphic and fills the raster graphic in the frame buffer. In a possible implementing manner, when performing rasterization on a graphic or an image to be displayed, the graphic accelerator may perform the work of position mapping from the interaction area to multiple effective interaction areas, and fill mapped data in the frame buffer.

C) Implementation on the frame buffer: The frame buffer is a part of a RAM, and is usually used by a digital display device to store bitmap data to be displayed. In a possible implementing manner, a target position of each pixel on the deformable display surface may be calculated according to the interaction area and the first relative position, and a position of a pixel in the frame buffer is adjusted to complete the foregoing mapping.

Further, in a frame buffer implementation in which double buffers are provided, one of the buffers may correspond to the interaction area, and the other one corresponds to an original display area of the deformable display surface to facilitate fast switching.

D) Implementation on a display screen driver that can perform physical pixel driving (for example, an organic light-emitting display OLED): Because each physical pixel on an OLED may be separately indexed to perform a display operation, where an OLED of a Freescale HCS08 series is used as an example, data in a display data random-access memory (Graphic Display Data RAM, GDDRAM) of the OLED may be changed to complete mapping. For example, data of one pixel is detected by using row and column indices, and the data is written to a new position that is calculated according to the first relative position.

In a possible implementing manner, a separate new mapping module may be added before B or C or D to implement the mapping.

In a possible implementing manner, optionally, the mapping the display information from the interaction area to the multiple effective interaction areas according to the first relative position comprises:

The display information is processed according to the first relative position to obtain multiple pieces of display sub-information respectively corresponding to the multiple effective interaction areas. Here, for processing of the display information according to the first relative position, reference may be made to one of the foregoing four methods.

Figure 4A:
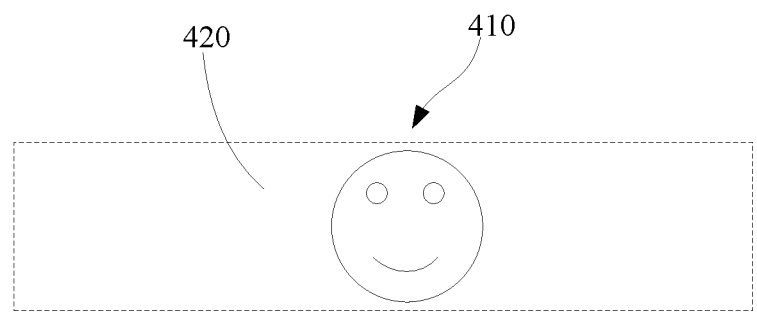
FIG. 4a to FIG. 4c are schematic diagrams of an application scenario of an interaction method according to an embodiment of the present application.
Figure 4B:
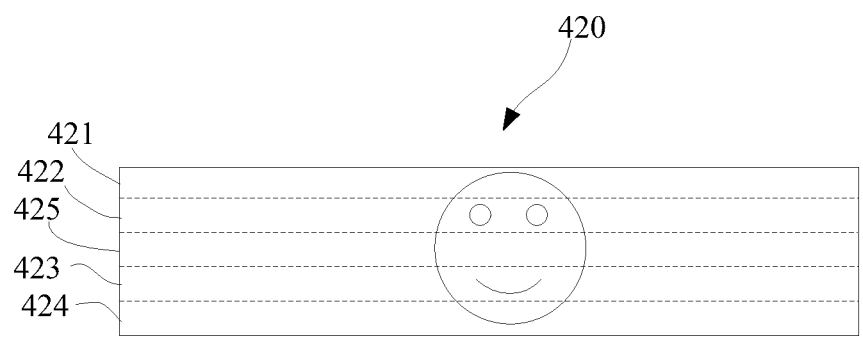
Figure 4C:
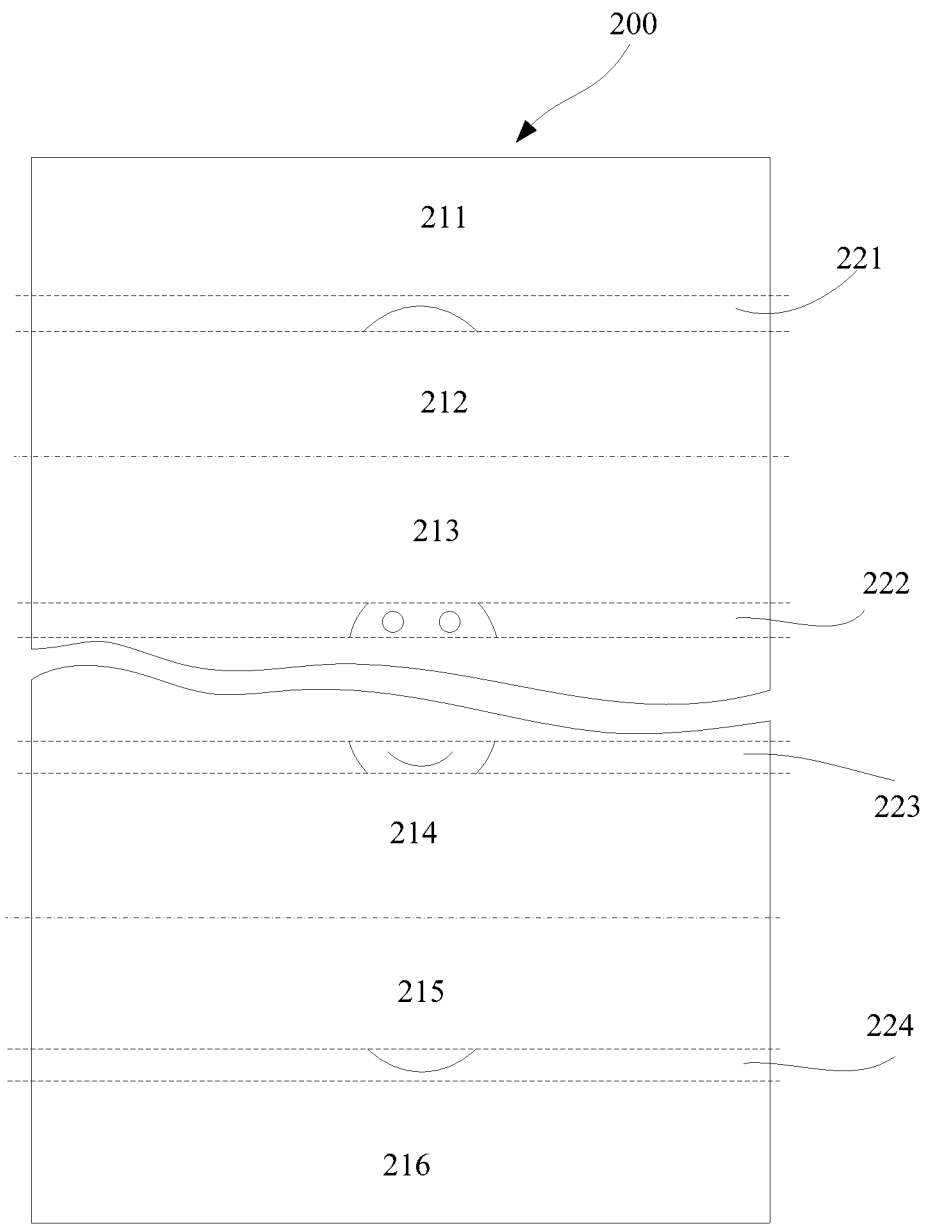

As shown in FIG. 4a to FIG. 4c, in a possible implementing manner, the deformable display surface 200 has the shape shown in FIG. 2c. A shape of an interaction area 410 obtained after the multiple effective interaction areas 221 to 225 are spliced is a rectangle shown in FIG. 4a. Display information matching the interaction area 410 is determined according to the interaction area 410. As shown in FIG. 4a and FIG. 4b, the display information corresponds to a display image 420.

The processing display information according to the first relative position, for example, may be: performing segmentation processing on the display image 420 according to the first relative position, to obtain multiple display image areas 421 to 425 corresponding to the multiple effective interaction areas.

During segmentation, image pixels of the display image 420 may be mapped one by one to display pixels of the multiple effective interaction areas 221 to 225 according to the first relative position.

It may be seen that, splicing of multiple display image areas 421 to 425 acquired by an interaction object by using the adjacent multiple effective interaction areas 221 to 225 may have basically the same effect as the display image 420 acquired by the interaction object by using an interaction area 410.

In some possible implementing manners, optionally, the deformable display surface may further be, in addition to an image display surface that can be used to display an image, another optical signal output surface used for optical communication.

As shown in FIG. 4c, in a possible implementing manner, on the deformable display surface, an interaction area other than the multiple effective interaction areas may no longer perform image display, thereby reducing energy consumption of the deformable display surface.

Certainly, in other possible implementing manners, without affecting an interaction effect between the multiple effective interaction areas 221 to 225 and an interaction object, an interaction area other than the multiple effective interaction areas may also perform information output. For example, the wing-surface area 212 to 215 may also display content and the like before the folding deformation.

In a possible implementing manner, the interaction apparatus may comprise the deformable display surface, and S130 may further comprise:

respectively outputting the multiple pieces of display sub-information by using the multiple effective interaction areas.

It may be seen that, by using the foregoing method in this embodiment of the present application, output of the multiple pieces of display sub-information by using the multiple effective interaction areas and output of the display information by using the interaction area achieve the same or similar effects of interaction with an interaction object.

A person skilled in the art may understand that, in the foregoing method of specific implementing manners of the present application, sequence numbers of steps do not mean an order of executing the steps, where the order of executing the steps should be determined by the functions and internal logic of the steps, and should not constitute any limitation on implementation processes of the specific implementing manners of the present application.

Figure 5:
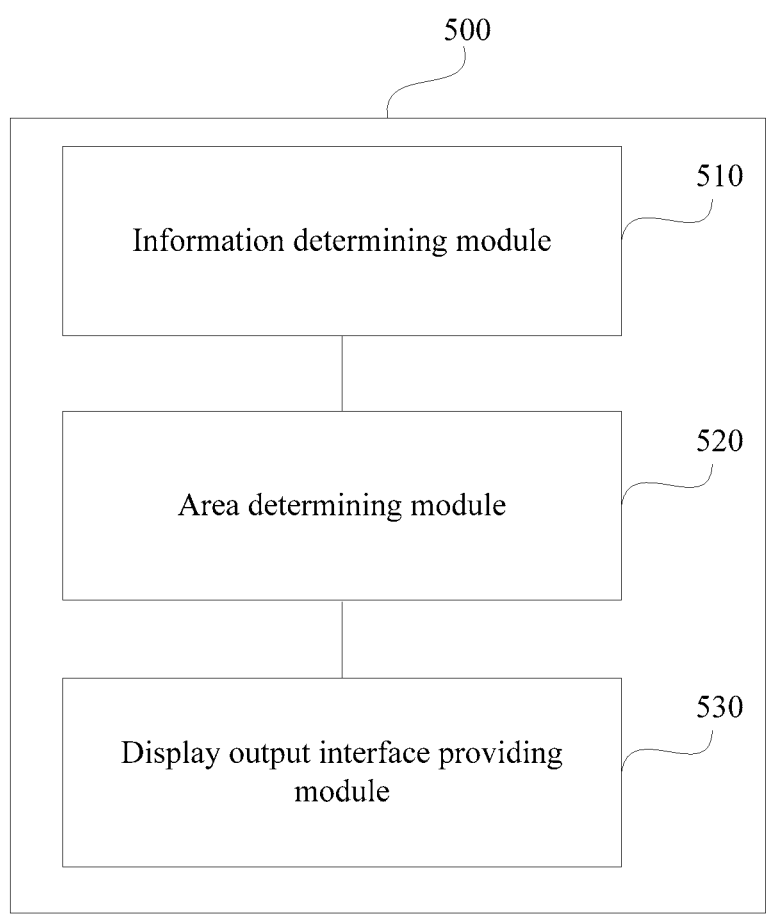
FIG. 5 is a schematic structural block diagram of an interaction apparatus according to an embodiment of the present application.

As shown in FIG. 5, a possible implementing manner of an embodiment of the present application provides an interaction apparatus 500, comprising:

an information determining module 510, configured to determine shape related information of a deformable display surface, where the shape related information corresponds to a first shape of the deformable display surface after a folding deformation;

an area determining module 520, configured to determine multiple effective interaction areas on the deformable display surface at least according to the shape related information, where the multiple effective interaction areas meet the following conditions: in nonadjacent positions on the deformable display surface, and adjacent in a spatial position in the first shape; and a display output interface providing module 530, configured to use the multiple effective interaction areas as one interaction area at least according to a first relative position of the multiple effective interaction areas in the spatial position in the first shape to provide a display output interface to at least one interaction object.

In an implementing manner in this embodiment of the present application, after a deformation of a deformable display surface occurs, multiple effective interaction areas adjacent in the spatial position are recombined to form one new interaction area used to provide a display output interface to an interaction object, thereby bringing new experience to a user by using a deformation property of a deformable device.

The modules and units in this embodiment of the present application are further described by using the following implementing manners.

In a possible implementing manner, optionally, the shape related information may comprise:

the first shape information of the first shape.

In another possible implementing manner, optionally, the shape related information may also be not the first shape information, and instead may indirectly obtain other information of the first shape information. For example, the shape related information comprises:

second shape information of a second shape of the deformable display surface before the folding deformation, and deformation information corresponding to the folding deformation.

Here, the deformation information may be a shape change parameter, or may be another parameter related to a deformation. For example, when the deformable display surface is a thermally-induced deformation material, the deformation information may comprise temperature change information and the like of areas. Alternatively, for example, the deformation information may further be displacement information, of areas on the deformable display surface, acquired by using an acceleration sensing array, a gyroscope array, and the like corresponding to the deformable display surface.

A person skilled in the art may know that the first shape may also be determined according to the second shape information and the deformation information.

Figure 6A:
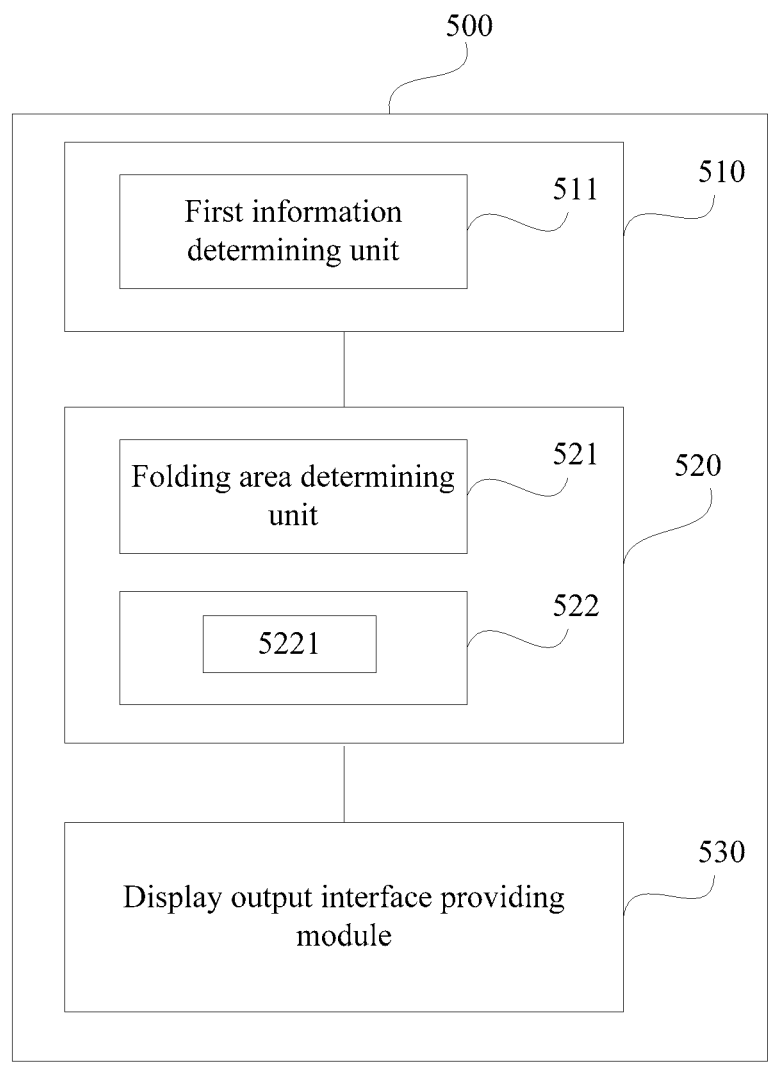
FIG. 6a to FIG. 6f are schematic structural block diagrams of six interaction apparatus according to an embodiment of the present application.
Figure 6B:
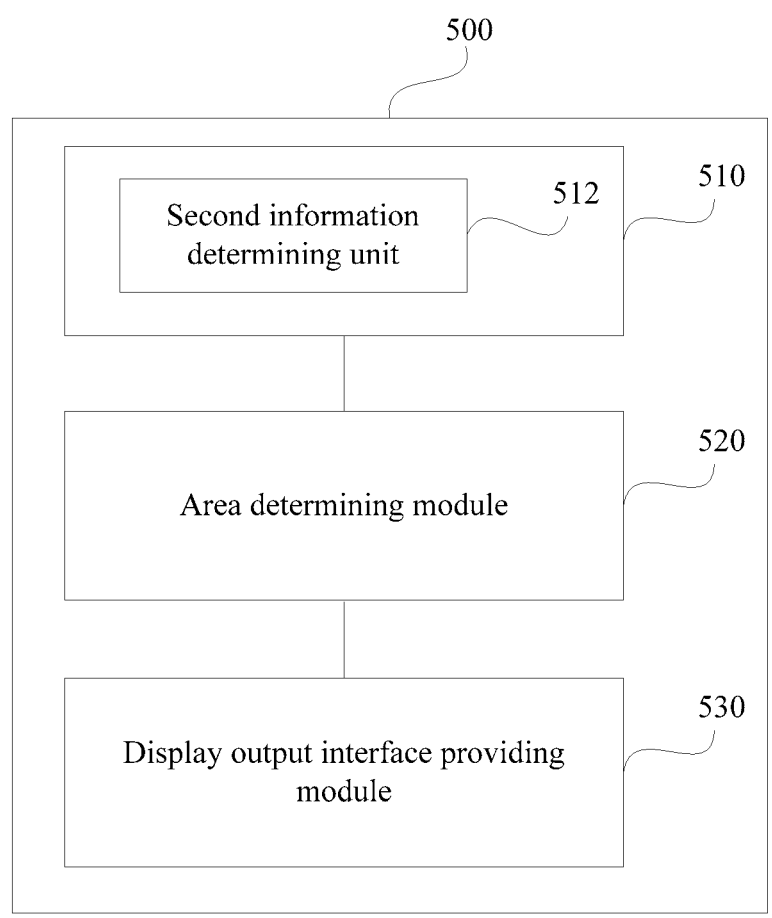

In a possible implementing manner, the deformable display surface is an interaction surface whose deformation is controllable, and is configured to perform different deformations according to different deformation control instructions. The deformation control instruction may be generated in response to an interaction object interaction operation. In a possible implementing manner, according to a beforehand setting, each deformation control instruction may correspond to shape information after a deformation; or may correspond to a piece of deformation information. Therefore, in a possible implementing manner, as shown in FIG. 6a, the information determining module 510 comprises:

a first information determining unit 511, configured to determine the shape related information at least according to a deformation control instruction, where the deformation control instruction is used to control the folding deformation of the deformable display surface.

In a possible implementing manner, the first information determining unit 511 may, for example, acquire a correspondence between at least one deformation control instruction and at least one piece of deformation related information from a storage module according to the deformation control instruction, where the storage module stores the correspondence, and then obtain deformation related information corresponding to the deformation control instruction.

In addition to the foregoing the deformation control instruction, a deformation sensor configured to acquire corresponding deformation sensing information according to a deformation of the deformable display surface may be further used to obtain the deformation related information. The deformation sensor, for example, may generate a corresponding voltage or current parameter value according to a deformation of the deformable display surface, where the deformation sensing information is the voltage or current parameter value. Therefore, in a possible implementing manner, as shown in FIG. 6 b, the information determining module 510 may comprise:

a second information determining unit 512, configured to determine the shape related information at least according to deformation sensing information for the deformable display surface.

In a possible implementing manner, that the multiple effective interaction areas are adjacent in the spatial position comprises:

for a first effective interaction area of the multiple effective interaction areas, at least another effective interaction area that is adjacent in the spatial position to the first effective interaction area exists, where the first effective interaction area is any effective interaction area of the multiple effective interaction areas.

In a possible implementing manner, that two effective interaction areas are adjacent in a spatial position may be that a distance between nearby edges of the two effective interaction areas is approximately 0.

Alternatively, in another possible implementing manner, that two effective interaction areas are adjacent in a spatial position may be that a distance between nearby edges of the two interaction areas is less than a set value.

In some possible implementing manners, the set value may be determined according to influence of the distance on interaction of the interaction object. For example, when the distance between two adjacent effective interaction areas is too large for a user to view content displayed by the two effective interaction areas as a whole, the distance between the two effective interaction areas is greater than the set value.

In a possible implementing manner, in addition to the shape related information, other information may further need to be combined to obtain the multiple effective interaction areas.

For example, in a possible implementing manner, because interaction between the deformable display surface and the interaction object is directional, in this case, to make use of a user more convenient, the area determining module 520 is further configured to:

determine the multiple effective interaction areas on the deformable display surface according to the shape related information and a second relative position of an interaction object relative to the deformable display surface after the folding deformation. For details, reference is made to corresponding description in the embodiment shown in FIG. 3*b*.

In a possible implementing manner, as shown in FIG. 6*a*, the area determining module 520 comprises:

a folding area determining unit 521, configured to determine, according to the shape related information, multiple folding areas where multiple outwardly-bending end surfaces are located, where the multiple outwardly-bending end surfaces are adjacent in the spatial position on the deformable display surface in the first shape; and an area determining unit 522, configured to determine the multiple effective interaction areas at least according to the multiple folding areas.

In a possible implementing manner, the multiple effective interaction areas are the multiple folding areas. Therefore, in this implementing manner, as shown in FIG. 6*a*, the area determining unit 522 comprises:

a first determining subunit 5221, configured to determine that the multiple folding areas are the multiple effective interaction areas.

Figure 6C:
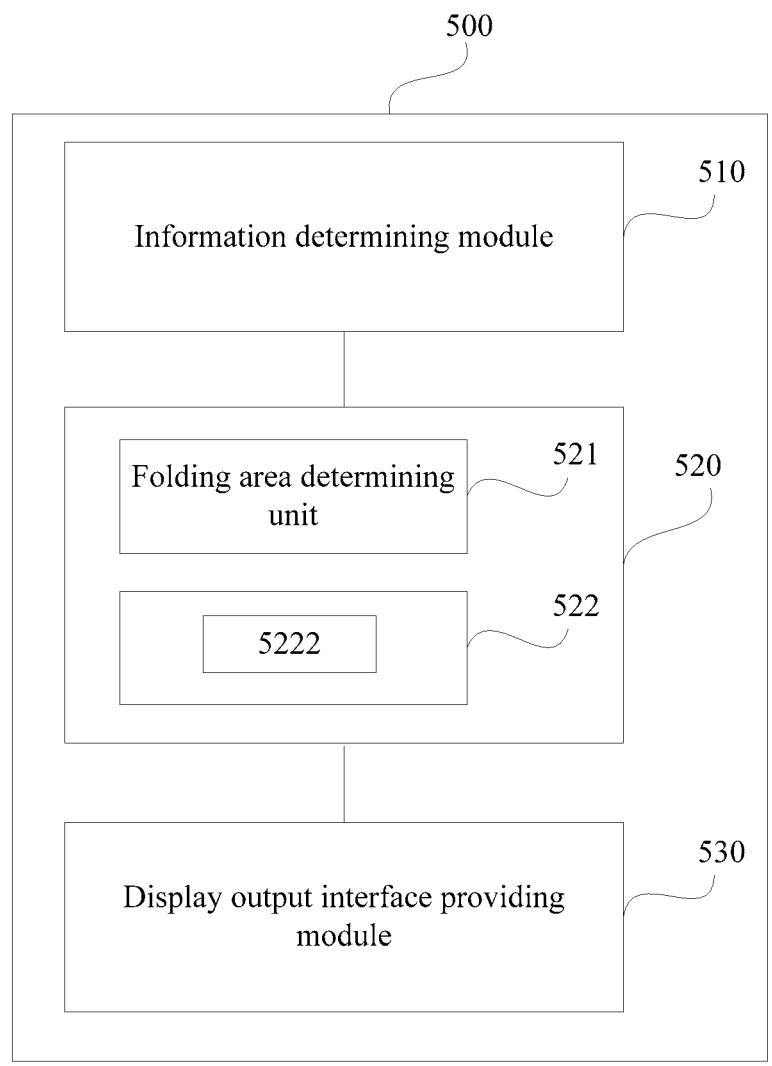

In some possible implementing manners, in addition to the foregoing the multiple folding areas, the multiple effective interaction areas may further comprise another area that is adjacent to or is connected to the multiple folding areas in the spatial position after the folding deformation occurs. Therefore, in this implementing manner, as shown in FIG. 6*c*, the area determining unit 522 comprises:

a second determining subunit 5222, configured to determine the multiple effective interaction areas at least according to the multiple folding areas and the first shape.

Figure 6D:
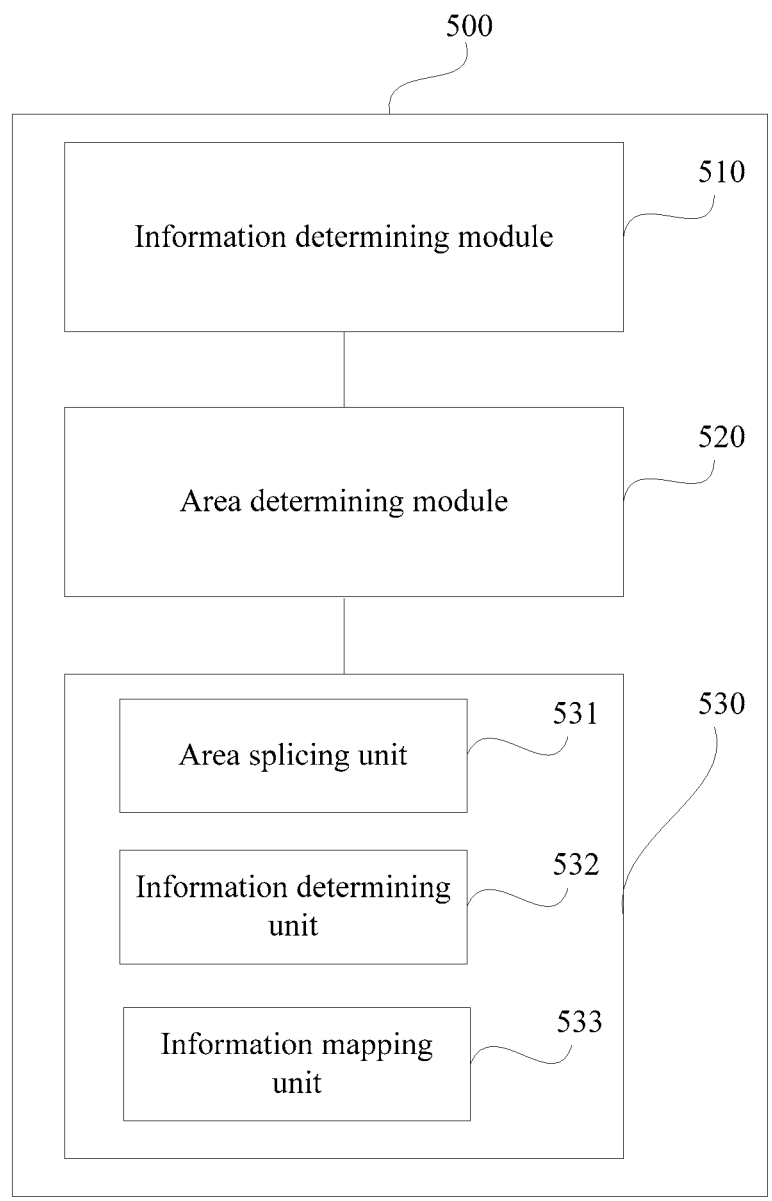

In a possible implementing manner, as shown in FIG. 6*d*, optionally, the display output interface providing module 530 may comprise:

an area splicing unit 531, configured to perform splicing on the multiple effective interaction areas according to the first relative position to form the interaction area. For a specific splicing manner, reference is made to the corresponding description in the foregoing method embodiments.

In a possible implementing manner, as shown in FIG. 6*d*, optionally, the display output interface providing module 530 may further comprise:

an information determining unit 532, configured to determine display information matching the interaction area; and an information mapping unit 533, configured to map the display information from the interaction area to the multiple effective interaction areas according to the first relative position.

Figure 6E:
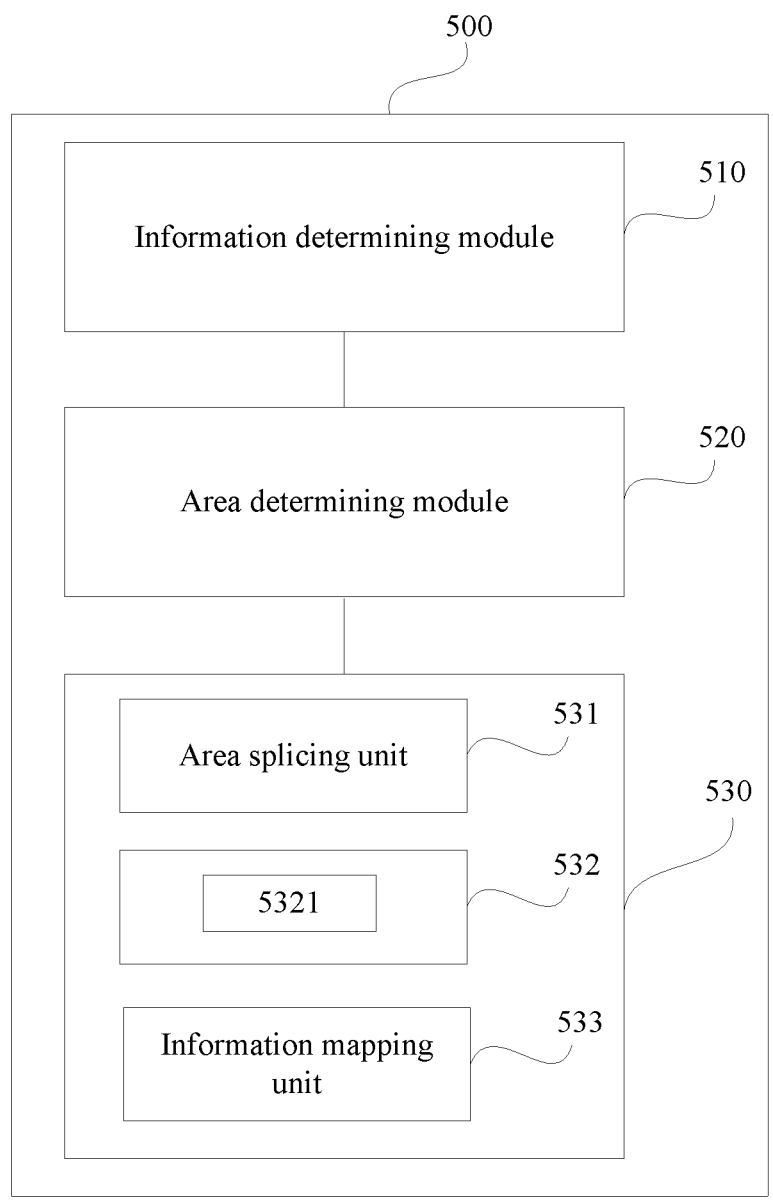

In a possible implementing manner, as shown in FIG. 6*e*, optionally, the information determining unit 532 comprises:

an information determining subunit 5321, configured to determine, at least according to display property information of the interaction area, display information matching the display property information.

In a possible implementing manner, the display property information may comprise:

display area shape information; for example, a size and an outer shape (for example, a rectangle and a circle) of a display area.

In this implementing manner, the display information matching the display area shape information, for example, may be that:

a size and an outer shape of display content corresponding to the display information matches a size and an outer shape of the display area.

In another possible implementing manner, the display property information may further comprise:

a distribution property of display pixels, for example, a quantity and a density distribution of the display pixels.

In this implementing manner, the display information matching the display area shape information, for example, may be that:

a quantity and a density distribution of image pixels corresponding to the display information are consistent with a quantity and a density distribution of the display pixels.

In a possible implementing manner, optionally, the information determining subunit 5321 may find, in a database, display information matching the display property information according to the display property information.

In another possible implementing manner, optionally, after acquiring the display property information, the information determining subunit 5321 performs calculation (for example, by using an algorithm such as intelligent cropping and digest generation in the method embodiment) to obtain the display information.

In still another possible implementing manner, according to a beforehand setting, a folding deformation of the deformable display surface may correspond to fixed display information. Therefore, the information determining unit 532 the display information may be determined according to the folding deformation or the first shape.

Figure 6F:
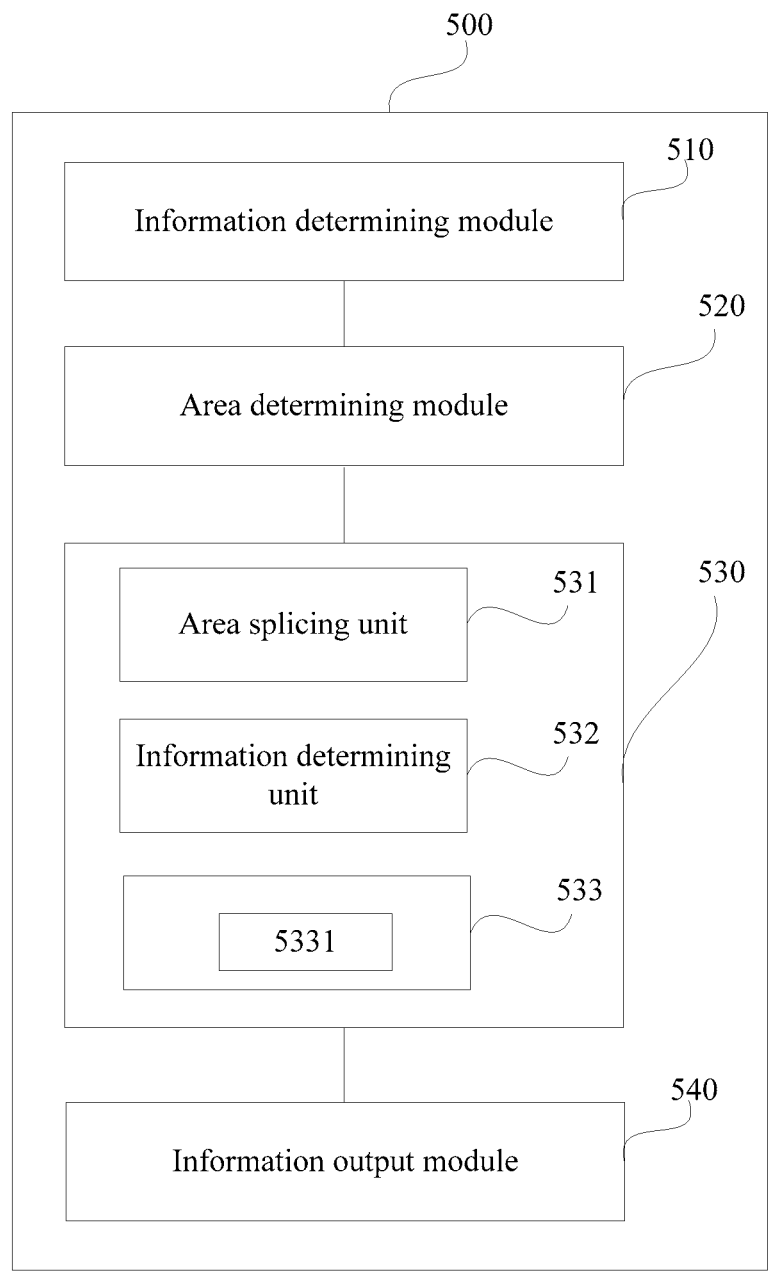

In a possible implementing manner, optionally, as shown in FIG. 6*f*, the information mapping unit 533 comprises:

a processing subunit 5331, configured to process the display information according to the first relative position to obtain multiple pieces of display sub-information respectively corresponding to the multiple effective interaction areas.

Here, for that the processing subunit 5331 processes the display information, reference may be made to the several manners in the foregoing method embodiment, and detailed description is no longer provided herein.

In a possible implementing manner, optionally, as shown in FIG. 6*f*, the apparatus 500 further comprises:

an information output module 540, configured to display the multiple pieces of display sub-information respectively by using the multiple effective interaction areas.

It may be seen that, by using the foregoing method in this embodiment of the present application, output of the multiple pieces of display sub-information by using the multiple effective interaction areas and output of the display information by using the interaction area achieve the same or similar effects of interaction with an interaction object.

For further description of functions of modules and units in this embodiment of the present application, reference may be made to the corresponding description in the foregoing method embodiments.

Figure 7:
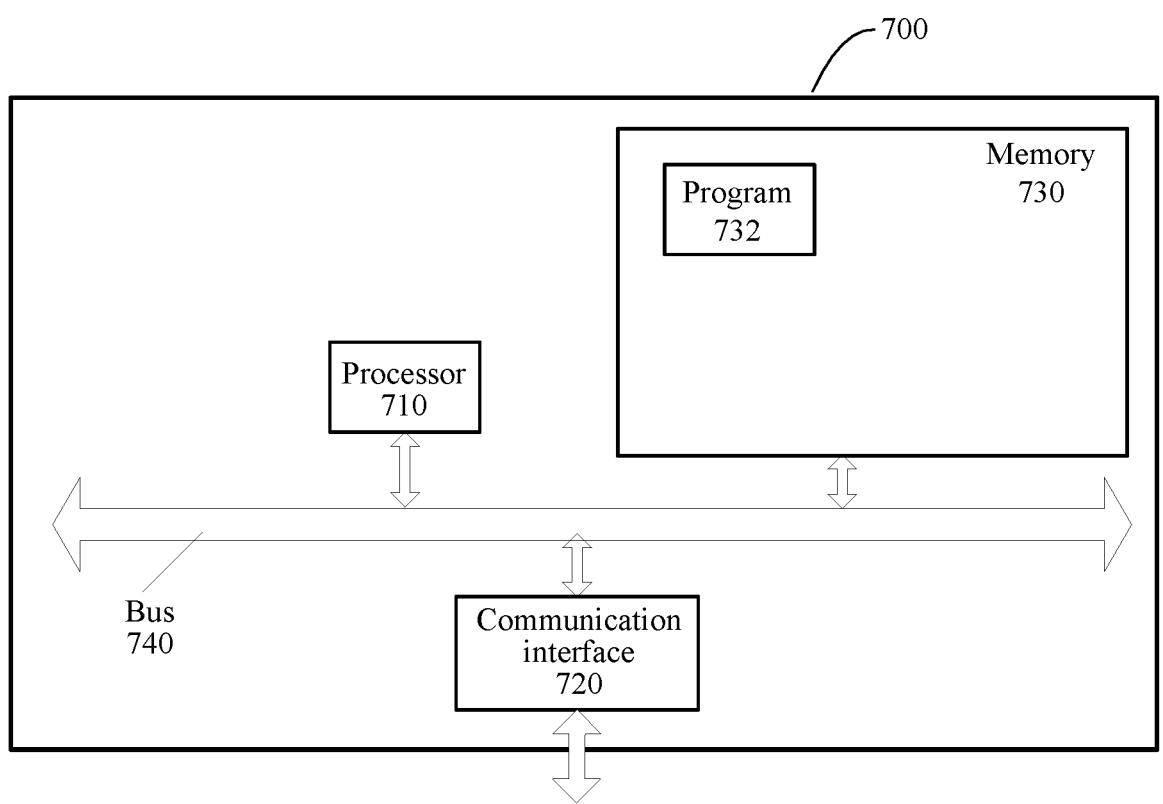
FIG. 7 is a schematic structural block diagram of user equipment according to an embodiment of the present application.

FIG. 7 is a schematic structural diagram of user equipment 700 according to an embodiment of the present application. In a specific embodiment of the present application, a specific implementation of the user equipment 700 is not limited. As shown in FIG. 7, the user equipment 700 may comprise:

a processor 710, a communication interface 720, a memory 730, and a communication bus 740.

The processor 710, the communication interface 720, and the memory 730 accomplish communication with each other by using the communication bus 740.

The communication interface 720 is configured to communicate with a network element such as a client.

The processor 710 is configured to execute a program 732, and specifically may execute related steps in the foregoing method embodiment.

Specifically, the program 732 may comprise program code, where the program code comprises a computer operation instruction.

The processor 710 may be a central processing unit (CPU), or an application specific integrated circuit (ASIC), or may be configured as one or more integrated circuits that implement this embodiment of the present application.

The memory 730 is configured to store the program 732. The memory 730 may comprise a high-speed RAM, or may further comprise a non-volatile memory, for example, at least one magnetic disk memory. The program 732 specifically may be configured to cause the user equipment 700 to execute the following operations:

determining shape related information of a deformable display surface, where the shape related information corresponds to a first shape of the deformable display surface after a folding deformation;

determining multiple effective interaction areas on the deformable display surface at least according to the shape related information, where the multiple effective interaction areas meet the following conditions: in nonadjacent positions on the deformable display surface, and adjacent in a spatial position in the first shape; and using the multiple effective interaction areas as one interaction area at least according to a first relative position of the multiple effective interaction areas in the spatial position in the first shape to provide a display output interface to at least one interaction object.

Reference may be made to corresponding description of corresponding steps and units in the foregoing embodiment for specific implementation of the steps in the program 732, which is no longer elaborated herein. A person skilled in the art may clearly understand that, for convenience and simplicity of description, reference may be made to corresponding process description in the foregoing method embodiment for a specific working process of devices and modules described above, which are no longer elaborated herein.

It can be appreciated by those skilled in the art that each exemplary units and method steps described with reference to the embodiments disclosed in this text can be implemented by electronic hardware or a combination of computer software and electronic hardware. Whether these functions are executed in a hardware mode or a software mode depends on the specific applications and design constraint conditions of the technical solutions. The professional technicians can use different methods to implement the functions described with respect to each specific application, but this implementation should not be considered to go beyond the scope of the present invention.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a server, or network equipment, etc.) to execute all or some steps of the method described in each embodiment of the present application. The foregoing storage medium comprises various media which can store a program code, such as a USB disk, a mobile hard disk, a read-only memory (ROM), a random-access memory (RAM), a magnetic disk or a compact disk.

The above implementations are only used to describe the present application, without limiting the present application; various alterations and variants can be made by those skilled in the art without departing from the spirit and scope of the present application, so all equivalent technical solutions also belong to the scope of the present application, and the scope of patent protection of the present application should be defined by claims.

What is claimed is:

1. An interaction method for displaying content using a deformable display surface, comprising: after a folding deformation of the deformable display surface occurs, determining shape related information of the deformable display surface, wherein the shape related information corresponds to a first shape of the deformable display surface formed after the folding deformation;

determining multiple effective interaction areas on the deformable display surface after the folding deformation at least according to the shape related information, wherein the multiple effective interaction areas are areas which perform an effective interaction with at least one interaction object, and meet the following conditions: being in nonadjacent positions of the deformable display surface before the folding deformation, and being adjacent in a spatial position in the first shape of the deformable display surface formed after the folding deformation to form one new larger effective interaction area, wherein the multiple effective interaction areas are in the same deformable display surface, wherein two effective interaction areas are deemed as adjacent in a spatial position if a distance between nearby edges of the two effective interaction areas is less than a set value and greater than zero, and wherein the set value is determined so that content presented by the two effective interaction areas is viewed by the at least one interaction object as a whole; and using the new larger effective interaction area at least according to a first relative position of the multiple effective interaction areas in the spatial position in the first shape to provide a display output interface to the at least one interaction object for displaying content, wherein the shape related information comprises: second shape information of a second shape of the deformable display surface before the folding deformation, and deformation information corresponding to the folding deformation.

2. The method of claim 1, wherein the shape related information comprises:

first shape information of the first shape.

3. The method of claim 1, wherein the shape related information is determined at least according to a deformation control instruction.

4. The method of claim 1, wherein the shape related information is determined at least according to deformation sensing information for the deformable display surface.

5. The method of claim 1, wherein the determining multiple effective interaction areas at least according to the shape related information comprises:

determining the multiple effective interaction areas on the deformable display surface according to the shape related information and a second relative position of an interaction object relative to the deformable display surface after the folding deformation.

6. The method of claim 1, wherein the determining multiple effective interaction areas at least according to the shape related information comprises:
    determining, according to the shape related information, multiple folding areas where multiple outwardly-bending end surfaces are located, wherein the multiple outwardly-bending end surfaces are adjacent in the spatial position on the deformable display surface in the first shape; and
    determining the multiple effective interaction areas at least according to the multiple folding areas.

7. The method of claim 6, wherein the determining the multiple effective interaction areas at least according to the multiple folding areas comprises:
    determining that the multiple effective interaction areas are the multiple folding areas.

8. The method of claim 6, wherein the determining the multiple effective interaction areas at least according to the multiple folding areas comprises:
    determining the multiple effective interaction areas at least according to the multiple folding areas and the first shape.

9. The method of claim 1, wherein that the multiple effective interaction areas are adjacent in the spatial position comprises:
    for a first effective interaction area of the multiple effective interaction areas, at least another effective interaction area that is adjacent in the spatial position to the first effective interaction area exists, wherein the first effective interaction area is any effective interaction area of the multiple effective interaction areas.

10. The method of claim 1, wherein the using the multiple effective interaction areas as one interaction area at least according to the first relative position to provide the display output interface to the at least one interaction object comprises:
    splicing on the multiple effective interaction areas according to the first relative position to form the interaction area.

11. The method of claim 1, wherein the using the multiple effective interaction areas as one interaction area to provide the display output interface to the at least one interaction object comprises:
    determining display information matching the interaction area; and
    mapping the display information from the interaction area to the multiple effective interaction areas according to the first relative position.

12. The method of claim 11, wherein the determining display information matching the interaction area comprises:
    determining, at least according to display property information of the interaction area, display information matching the display property information.

13. The method of claim 12, wherein the display property information comprises at least one of the following:
    display area shape information and a distribution property of display pixels.

14. The method of claim 11, wherein the mapping the display information from the interaction area to the multiple effective interaction areas according to the first relative position comprises:
    the display information is processed according to the first relative position to obtain multiple pieces of display sub-information respectively corresponding to the multiple effective interaction areas.

15. The method of claim 14, wherein the using the multiple effective interaction areas as one interaction area to provide the display output interface to the at least one interaction object further comprises:
    displaying the multiple pieces of display sub-information respectively by using the multiple effective interaction areas.

16. A non-transitory computer-readable storage medium configured with instructions executable by one or more processors to cause the one or more processors to perform operations comprising:
    after a folding deformation of a deformable display surface occurs:
    determining shape related information of the deformable display surface, wherein the shape related information corresponds to a first shape of the deformable display surface formed after the folding deformation;
    determining multiple effective interaction areas on the deformable display surface after the folding deformation at least according to the shape related information, wherein the multiple effective interaction areas are areas which perform an effective interaction with at least one interaction object, and meet the following conditions: being in nonadjacent positions of the deformable display surface before the folding deformation, and being adjacent in a spatial position in the first shape of the deformable display surface formed after the folding deformation to form one new larger effective interaction area, wherein the multiple effective interaction areas are in the same deformable display surface, wherein two effective interaction areas are deemed as adjacent in a spatial position if a distance between nearby edges of the two interaction areas is less than a set value and greater than zero, and wherein the set value is determined so that content presented by the two effective interaction areas is viewed by the at least one interaction object as a whole; and
    using the new larger effective interaction area at least according to a first relative position of the multiple effective interaction areas in the spatial position in the first shape to provide a display output interface to the at least one interaction object for displaying content,
    wherein the shape related information comprises: second shape information of a second shape of the deformable display surface before the folding deformation, and deformation information corresponding to the folding deformation.

17. User equipment for displaying content using a deformable display surface, wherein the user equipment comprises:
    a memory, configured to store a program; and
    a processor, configured to execute the program stored in the memory, wherein the program causes the processor to execute operations including:
    after a folding deformation of the deformable display surface occurs:
    determining shape related information of the deformable display surface, wherein the shape related information corresponds to a first shape of the deformable display surface formed after the folding deformation;
    determining multiple effective interaction areas on the deformable display surface after the folding deformation at least according to the shape related information, wherein the multiple effective interaction areas are areas which perform an effective interaction with at least one interaction object, and meet the following conditions: being in nonadjacent positions of the deformable display surface before the folding deformation, and being adjacent in a spatial position in the first shape of the deformable display surface formed after the folding deformation to form one new larger effective interaction area, wherein the multiple effective interaction areas are in the same deformable display surface, wherein two effective interaction areas are deemed as adjacent in a spatial position if a distance between nearby edges of the two interaction areas is less than a set value and is greater than zero, and wherein the set value is determined so that content presented by the two effective interaction areas is viewed by the at least one interaction object as a whole; and using the new larger effective interaction area at least according to a first relative position of the multiple effective interaction areas in the spatial position in the first shape to provide a display output interface to the at least one interaction object for displaying content, wherein the shape related information comprises: second shape information of a second shape of the deformable display surface before the folding deformation, and deformation information corresponding to the folding deformation.

18. The user equipment of claim 17, wherein the shape related information comprises: first shape information of the first shape.

19. The user equipment of claim 17, wherein the shape related information comprises:
second shape information of a second shape of the deformable display surface before the folding deformation, and deformation information corresponding to the folding deformation.

20. The user equipment of claim 17, wherein the operations further comprise:
determining the shape related information at least according to a deformation control instruction.

21. The user equipment of claim 17, wherein the operations further comprise:
determining the shape related information at least according to deformation sensing information for the deformable display surface.

22. The user equipment of claim 17, wherein the operations further comprise:
determining the multiple effective interaction areas on the deformable display surface according to the shape related information and a second relative position of an interaction object relative to the deformable display surface after the folding deformation.

23. The user equipment of claim 17, wherein the operations further comprise:
determining according to the shape related information, multiple folding areas where multiple outwardly-bending end surfaces are located, wherein the multiple outwardly-bending end surfaces are adjacent in the spatial position on the deformable display surface in the first shape; and
determining the multiple effective interaction areas at least according to the multiple folding areas.

24. The user equipment of claim 23, wherein the operations further comprise:
determining the multiple folding areas as the multiple effective interaction areas.

25. The user equipment of claim 23, wherein the operations further comprise:
determining the multiple effective interaction areas at least according to the multiple folding areas and the first shape.

26. The user equipment of claim 17, wherein that the multiple effective interaction areas are adjacent in the spatial position comprises:
for a first effective interaction area of the multiple effective interaction areas, at least another effective interaction area that is adjacent in the spatial position to the first effective interaction area exists, wherein the first effective interaction area is any effective interaction area of the multiple effective interaction areas.

27. The user equipment of claim 17, wherein the operations further comprise:
splicing on the multiple effective interaction areas according to the first relative position to form the interaction area.

28. The user equipment of claim 17, wherein the operations further comprise:
determining display information matching the interaction area; and
mapping the display information from the interaction area to the multiple effective interaction areas according to the first relative position.

29. The user equipment of claim 28, wherein the operations further comprise:
determining, at least according to display property information of the interaction area, display information matching the display property information.

30. The user equipment of claim 29, wherein the display property information comprises at least one of the following:
display area shape information and a distribution property of display pixels.

31. The user equipment of claim 28, wherein the operations further comprise:
processing the display information according to the first relative position to obtain multiple pieces of display sub-information respectively corresponding to the multiple effective interaction areas.

32. The user equipment of claim 31, wherein the operations further comprise:
displaying the multiple pieces of display sub-information respectively by using the multiple effective interaction areas.

* * * * *